(12) United States Patent
Vogt et al.

(10) Patent No.: US 8,168,085 B2
(45) Date of Patent: May 1, 2012

(54) WHITE LIGHT PHOSPHORS FOR FLUORESCENT LIGHTING

(75) Inventors: Thomas Vogt, Chapin, SC (US); Sangmoon Park, Busan (KR)

(73) Assignee: University of South Carolina, Columbia, SC (US)

( * ) Notice: Subject to any disclaimer, the term of this patent is extended or adjusted under 35 U.S.C. 154(b) by 695 days.

(21) Appl. No.: 12/348,610

(22) Filed: Jan. 5, 2009

(65) Prior Publication Data

US 2009/0174310 A1 Jul. 9, 2009

Related U.S. Application Data

(60) Provisional application No. 61/009,930, filed on Jan. 3, 2008.

(51) Int. Cl.
*C09K 11/61* (2006.01)
(52) U.S. Cl. ............. 252/301.4 H; 252/301.5; 313/462; 313/464; 313/465
(58) Field of Classification Search ........... 252/301.4 H, 252/301.5; 423/462, 464, 465
See application file for complete search history.

(56) References Cited

U.S. PATENT DOCUMENTS

| | | | |
|---|---|---|---|
| 6,924,233 B1 | 8/2005 | Chua et al. | |
| 6,982,045 B2 | 1/2006 | Menkara et al. | |
| 6,987,353 B2 | 1/2006 | Menkara et al. | |
| 7,109,648 B2 | 9/2006 | Menkara et al. | |
| 7,112,921 B2 | 9/2006 | Menkara et al. | |
| 2009/0127508 A1 | 5/2009 | Kubel | |
| 2009/0212314 A1 | 8/2009 | Im et al. | |

OTHER PUBLICATIONS

Vogt et al, "Sr3MO4F (M=Al,Ga)—A New Family of Ordered Oxyfluorides", Journ. Solid State Chem, 144, 1999, pp. 228-231.*
Prodjosantoso et al, "Cation and Anion ordering in the layered oxyfluorides Sr3-xAxAlO4F (A=Ba, Ca)", Jorn. Solid State Chem., 172, 2003, pp. 89-94.*
Prodjosantoso, et al., Cation and anion ordering in the layered oxyfluorides $Sr_{3-x}A_xAlO_4F$ (A=Ba, Ca), *Journal of Solid State Chemistry*, 172 (2003), pp. 89-94.
Vogt, et al., Brief Communication, "$Sr_3MO_4F$ (M=Al, Ga)—A New Family of Ordered Oxyfluorides" *Journal of Solid State Chemistry*, 144, pp. 228-231 (1999).
Citation of U.S. Appl. No. 12/476,652.

* cited by examiner

*Primary Examiner* — Carol M Koslow
(74) *Attorney, Agent, or Firm* — Dority & Manning, P.A.

(57) ABSTRACT

Materials suitable for use in highly energy-efficient production of white light through photo-luminescence, such as in light emitting devices, are generally provided. A composition comprising a compound having the formula: $Sr_{3-v}A_vMO_{4-x}F_{1-y}$ wherein A is Ca, Ba, or a mixture thereof; M is Al, Ga, In, W, Mo, or a mixture thereof; $0 \leq v \leq 1$; $0 < x < 0.4$; and $0 < y < 0.2$ is generally described. A composition comprising a compound having the formula: $Sr_{3-v}A_vIn_{1-m}M_mO_{4-x}F$, where A is Ca, Ba, or a mixture thereof; M is Al, Ga, W, Mo, or a mixture thereof; $0 \leq v \leq 1$; $0 < m < 1$; and $0 < x < 4$ is also provided. Nitrogen can be substituted for a portion of the oxygen atoms in these structures. Methods introducing defects into a compound by removing a portion of oxygen and fluorine atoms from the compound are also provided.

25 Claims, 4 Drawing Sheets

(a) $Sr_3AlO_{4-x}F$ ($H_2$/Ar)
(b) $Sr_3AlO_4F_{1-y}$ (In Air)
(c) $Sr_3AlO_{4-x}F_{1-y}$ ($H_2$/Ar after In Air)

(a) $Sr_3AlO_{4-x}F$ ($H_2$/Ar)
(b) $Sr_3AlO_4F_{1-y}$ (In Air)
(c) $Sr_3AlO_{4-x}F_{1-y}$ ($H_2$/Ar after In Air)

WHITE LIGHT PHOSPHORS FOR FLUORESCENT LIGHTING

PRIORITY INFORMATION

The present application claims priority to U.S. Provisional Patent Application Ser. No. 61/009,930 filed on Jan. 3, 2008, the disclosure of which is incorporated by reference herein.

BACKGROUND OF INVENTION

Nearly 25% of the total world wide energy consumption in 2005 was used in the US. A third of the 100.2 quadrillion British Thermal Units ('quads') total US energy consumption is used for electricity. About 25% of the electricity in the US is used for lighting. About 8% of the total worldwide energy used is transformed into artificial lighting. Currently, inefficient incandescent lighting (efficiency ~5%) is being replaced by fluorescent lighting (compact fluorescent lights CFL at an efficiency ~25%) to reduce our carbon footprint.

The quantum efficiency in light-emitting devices based on photon conversion is the ratio of the number of emitted photons divided by the number of absorbed photons. The potential increase of the efficiency of fluorescent lamps from 25 to 50% by using multi-photon processes would translate into commensurate energy savings and provide a technology platform before advanced light-emitting diode (LED) technologies can significantly penetrate the market.

A light-emitting phosphor consists of a host lattice into which activator ions such as rare earths are doped at a few mol %. Certain lattices are self-activating and emit light without the presence of activators. Particular electronic energy levels of the activator ions can be populated either directly by excitation or indirectly via energy transfers inducing luminescence and non-radiative decay processes. Luminescence is a down-conversion process in which a higher energy photon (typically from the UV region between 200-400 nm) is absorbed and a lower energy photon is emitted in the visible region of the electromagnetic spectrum between 400 and 750 nm. This process is also referred to as a Stoke's process, and the difference in wavelength as the Stoke's shift. Alternatively, "anti-Stokes" processes or infra-red-to-visible light 'up-conversion' phosphors occur where two or more infra-red photons are absorbed to produce one visible photon at a higher energy.

Generally, two types of activator ions exist: those that interact weakly with the host lattice via their f-electron energy levels and those that interact strongly with it via their $s^2$ and/or d-electrons. In the first case, rare earth ions ($RE^{n+}$) allow optical transitions between their different discrete energy levels resulting in narrow line emissions as seen, for example, in $Y_2O_3:Eu^{3+}$, whereas in $s^2$ ions such as $Pb^{2+}$ or $Sb^{3+}$ and transitions metals such as $Mn^{2+}$ broad bands of radiation are emitted. The host materials must be optically transparent since excitations should only take place at the activator sites. Therefore, ions with rare gas electron configurations or closed electron shells are preferred.

About 90% of all artificially-generated photons come from discharge lamps generating UV light, the most widespread being those based on Hg plasma with 75% conversion efficiency. The low pressure Hg plasma has three main emission lines at 185, 254 and 365 nm. If the pressure is increased above 1000 torr, a continuum between 250 and 350 nm is created by the Hg discharge. Low-pressure Hg discharge lamps coupled with a phosphor coating have an energy conversion efficiency of about 25-30%.

A phosphor emits light in a narrow frequency range, unlike an incandescent filament, which emits the full spectrum, though not all colors equally, of visible light. Mono-phosphor lamps emit poor quality light. Their colors look bad and are inaccurate. The solution is to mix different phosphors, each emitting a different range of light. Properly mixed, a good approximation of daylight or incandescent light can be reached. However, every extra phosphor added to the coating mix causes a loss of efficiency and increased cost. Good-quality consumer CFLs use three or four phosphors—typically emitting light in the red, green and blue spectra—to achieve a "white" light with color-rendering indices (CRI) of around 80 although CFLs with a CRI as great as 96 have been developed. (A CRI of 100 represents the most accurate reproduction of all colors; reference sources having a CRI of 100, such as the sun and incandescent tungsten lamps, emit black body radiation.)

An example of a visible light phosphor is the co-doped fluoro-chloro-apatite $Ca_5(PO_4)_3(F,Cl):Sb^{3+},Mn^{2+}$, where the blue emissions from the $Sb^{3+}$ and the orange emissions from the $Mn^{2+}$ activators result in white light at about 80 lm/W. Another way to produce white light is by combining the red, green and blue emissions ("tricolor concept") using, for instance, $BaMgAl_{10}O_{17}:Eu$ (λmaxem=450 nm), (Ce,Gd,Tb) $MgB_6O_{10}$ (λmaxem=542 nm) and $Y_2O_3:Eu$ (λmaxem=611 nm) phosphors resulting in white light emission at about 100 lm/W.

SUMMARY OF INVENTION

Objects and advantages of the invention will be set forth in part in the following description, or may be obvious from the description, or may be learned through practice of the invention.

This invention is a material suitable for use in highly energy-efficient production of white light through photo-luminescence. In one embodiment, a composition comprising a compound having the formula:

$$Sr_{3-v}A_vMO_{4-x}F_{1-y}$$

wherein A is Ca, Ba, or a mixture thereof; M is Al, Ga, In, W, Mo, or a mixture thereof; $0 \leq v \leq 1$; $0 < x < 0.4$; and $0 < y < 0.2$ is generally described. The composition can further comprise nitrogen such that the compound has the formula:

$$Sr_{3-v}A_vMO_{4-x-z}F_{1-y}N_z$$

wherein $0 < z < 0.1$. The compound can be substantially free of a rare earth element or can further include an activator ion (e.g., La, Ac, Ce, Pr, Nd, Sm, Eu, Gd, Tb, Dy, Ho, Er, Tm, Yb, Th, U, Cr, Mn, Tc, Re, Cu, Ag, Au, Zn, Cd, Hg, As, Sb, Bi, Ge, Sn, Pb, In, Tl, and mixtures thereof) coupled with the compound.

In another embodiment, a composition comprising a compound having the formula:

$$Sr_{3-v}A_vIn_{1-m}M_mO_{4-x}F$$

where A is Ca, Ba, or a mixture thereof; M is Al, Ga, W, Mo, or a mixture thereof; $0 \leq v \leq 1$; $0 \leq m < 1$; and $0 < x < 4$ is also provided. The composition can further comprise nitrogen such that the compound has the formula:

$$Sr_{3-v}A_vIn_{1-m}M_mO_{4-x-z}FN_z$$

where A is Ca, Ba, or a mixture thereof; M is Al, Ga, W, Mo, or a mixture thereof; $0 \leq v \leq 1$; $0 \leq m < 1$; $0 < x < 4$; and $0 < z < 0.1$.

These compositions can be included in a light emitting device (either alone or in combination with other phosphors). For example, the light emitting device can include a discharge lamp (e.g., a Hg plasma lamp) generating UV light at about 254 nm to excite the composition such that the composition produces an emission in the visible light spectrum (e.g., wavelengths from about 380 to about 750 nm).

A method of doping a compound is also generally disclosed. According to the method, a compound having the formula:

wherein A is Ca, Ba, or a mixture thereof; M is Al, Ga, In, W, Mo, or a mixture thereof; and $0<x<4$ is generally provided. Defects can then be introduced into the compound by removing a portion of oxygen and fluorine atoms from the compound. The defects can be introduced into the compound by introducing hydrogen, argon, and/or a hydrogen/argon mixture gas to the compound at a temperature of from about 200° C. to about 1000° C.

Other features and aspects of the present invention are discussed in greater detail below.

BRIEF DESCRIPTION OF THE DRAWINGS

A full and enabling disclosure of the present invention, including the best mode thereof to one skilled in the art, is set forth more particularly in the remainder of the specification, which includes reference to the accompanying figures, in which.

DETAILED DESCRIPTION

Figure 1:
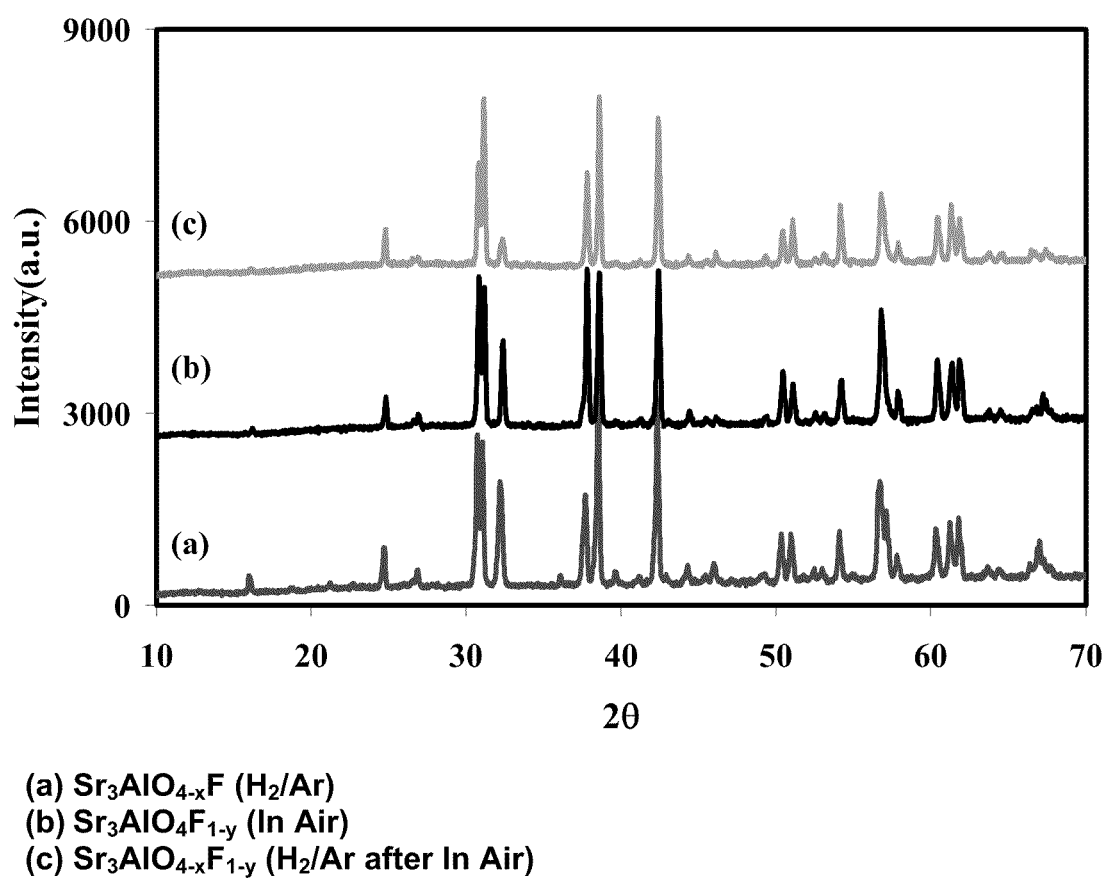
FIG. 1 is an illustration of the changes in the defect structure resulting in the new self-activating phosphors.
Figure 2:
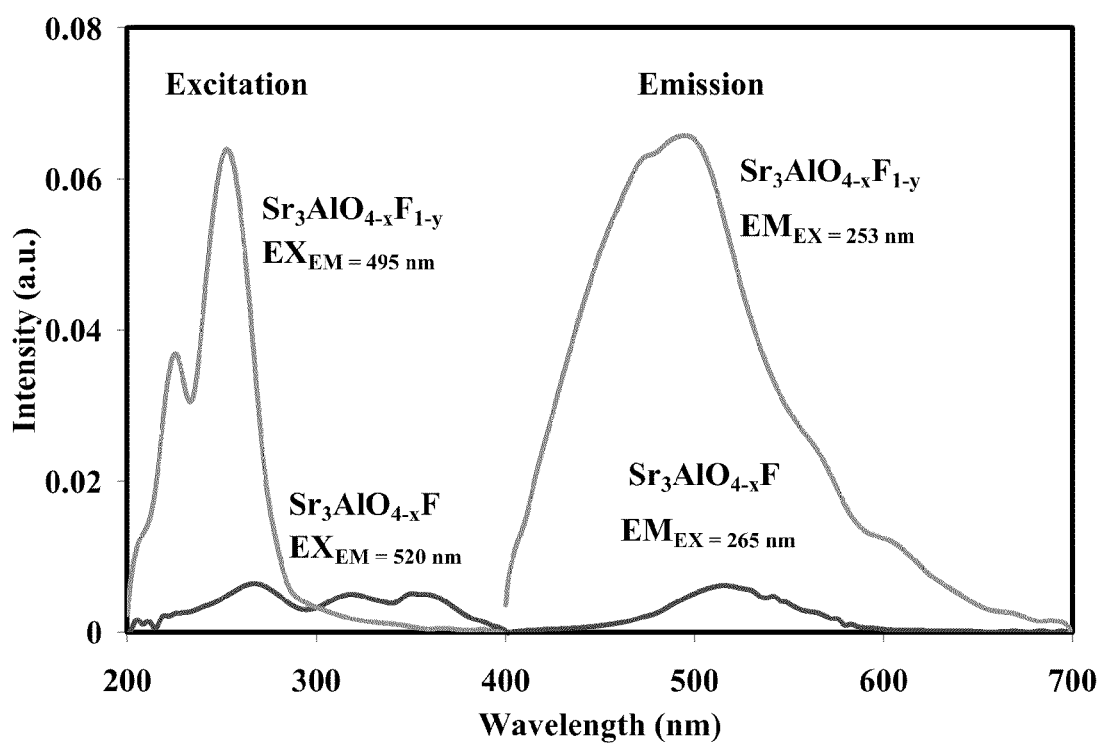
FIG. 2 reveals the excitation/emission spectra of the new phosphors and how defects in the fluorine sublattice result in a broad emission centered at about 500 nm with a width of over 200 nm in a phosphor without any rare earth activators.
Figure 3:
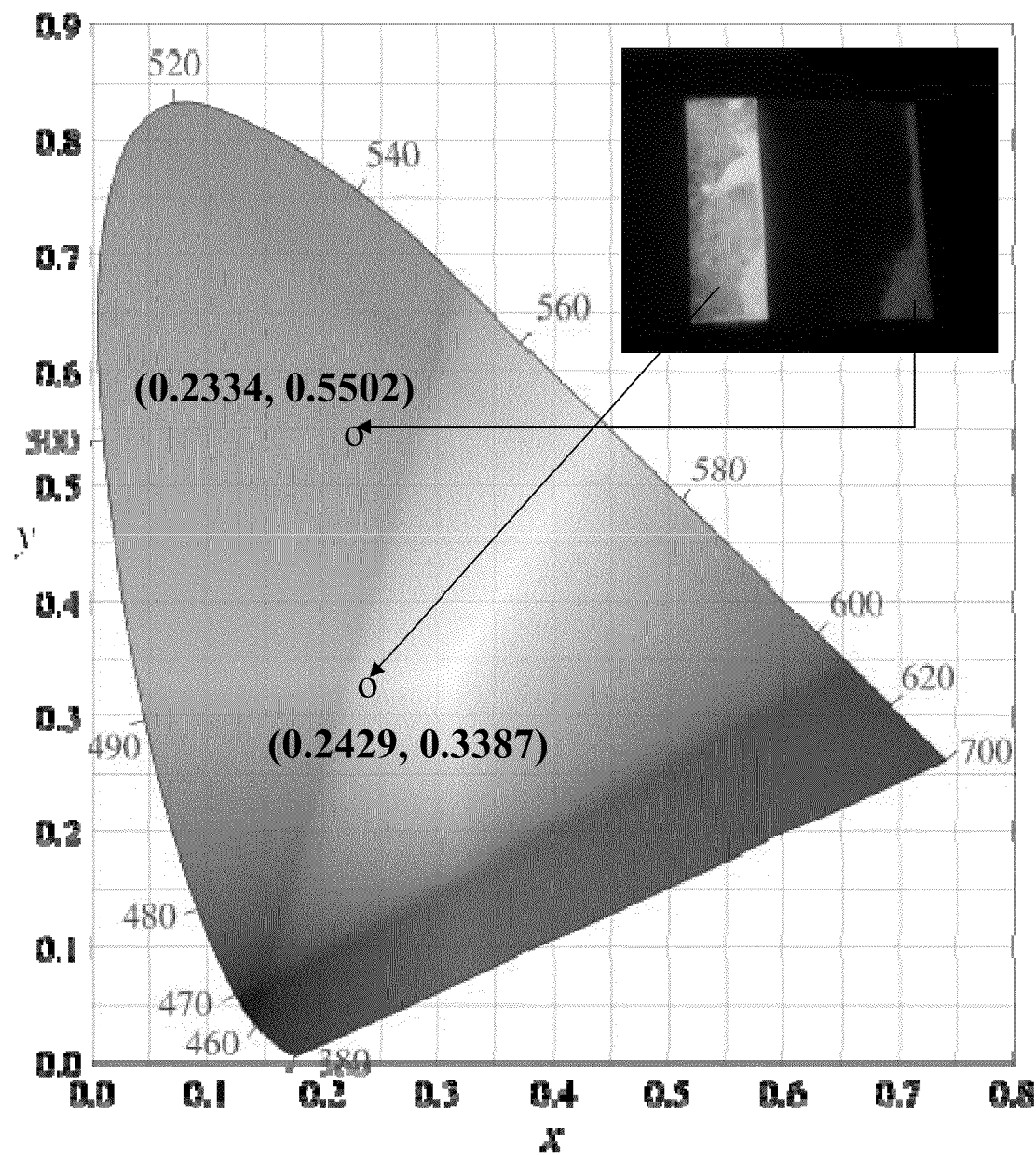
FIG. 3 shows a CIE diagram indicating the green emission of the self-activating phosphor $Sr_3AlO_{4-x}F$ as well as the whitish-blue emission of the $Sr_3AlO_{4-x}F_{1-y}$ phosphor under 254 nm UV light.

Reference now will be made to the embodiments of the invention, one or more examples of which are set forth below. Each example is provided by way of an explanation of the invention, not as a limitation of the invention. In fact, it will be apparent to those skilled in the art that various modifications and variations can be made in the invention without departing from the scope or spirit of the invention. For instance, features illustrated or described as one embodiment can be used on another embodiment to yield still a further embodiment. Thus, it is intended that the present invention cover such modifications and variations as come within the scope of the appended claims and their equivalents. It is to be understood by one of ordinary skill in the art that the present discussion is a description of exemplary embodiments only, and is not intended as limiting the broader aspects of the present invention, which broader aspects are embodied exemplary constructions.

Chemical elements are discussed in the present disclosure using their common chemical abbreviation, such as commonly found on a periodic table of elements. For example, hydrogen is represented by its common chemical abbreviation H; helium is represented by its common chemical abbreviation He; and so forth.

In general, the present disclosure is directed to phosphors for use in light emitting devices.

A. Indium (In) in an Ordered Oxyfluorine Compound

The present disclosure is directed to, in one embodiment, an ordered oxyfluorine compound containing indium. The compound can have the general formula:

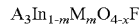

where A is Ca, Sr, Ba, or a mixture thereof; M is Al, Ga, W, Mo, or a mixture thereof; $0\leq m<1$; and $0<x<4$. The inclusion of In in this ordered oxyfluorine compound can result in light emission in the visible wavelengths upon excitation at 254 nm (e.g., UV excitation).

Control of the amount of In present in the ordered oxyfluorine can alter the emission wavelength. In one particular embodiment, m is from about 0.2 to about 0.5 (i.e., $0.2\leq m\leq 0.5$).

B. Defects in the Fluorine Sublattice

One particular embodiment of the present disclosure is directed to a self-activating phosphor including a compound having the general formula

where A is Ca, Ba, or a mixture thereof; M is Al, Ga, In, W, Mo, or a mixture thereof; $0\leq v\leq 1$; $0<x<0.4$; and $0<y<0.2$. This embodiment involves creating defects in the oxygen and fluorine sublattice of an ordered oxyfluorine compound.

The present inventors have discovered that introducing defects into the fluorine and oxygen sublattice of certain ordered oxyfluoride compounds can provide a compound having desirable luminescence properties particularly useful as phosphors. Additionally, the present inventors have discovered that the intensity of the emitted light from the self-activating phosphors can be controlled by controlling the amount of defects in the fluorine and oxygen sublattice.

Additionally, the activator doped phosphors of the present disclosure may be recycled to recover the starting materials, which is especially desirable when including a rare earth element in the self-activating or optically neutral phosphors. An oxidizing acid (i.e. $H_2O_2$, HCl, $HNO_3$) in an aqueous solution can degrade the self-activating phosphor and then the elements can be separated using know separation techniques.

The self-activating phosphor can be formed by doping an ordered oxyfluoride compound to introduce defects into its oxygen and fluorine sublattice. The ordered oxyfluoride compound, prior to the introduction of defects in its fluorine sublattice, can generally be represented by the formula:

where A is Ca, Ba, or a mixture thereof; M is Al, Ga, In, W, Mo, or a mixture thereof; $0\leq v\leq 1$; and $0<x<4$. These compounds crystallize in a layered structure in which layers made of isolated $MO_4$ tetrahedra that contain A (e.g., Ca, Sr, Ba, or a combination) as an intercalate are separated by $Sr_2F$ layers. Particularly suitable ordered oxyfluoride compounds for altering according to the present disclosure, such as $Sr_3MO_4F$ (where M is Al or Ga) and $Sr_{3-x}A_xMO_4F$ (where A is Ca or Ba, and M is Al or Ga), are discussed in T. Vogt, et al., Journal of Solid State Chemistry 144, 228-231 (1999) and A. K. Prodjosantoso, et al. Journal of Solid State Chemistry 172, 89-94 (2003), respectfully, both of which are incorporated by reference herein.

The defects in the oxygen and fluorine sublattice of the ordered oxyfluoride compounds can be introduced to form the presently disclosed self-activating phosphors according to any method. In one embodiment, the ordered oxyfluoride compound in a powder state can be introduced to the reducing gas (e.g., Hydrogen or Hydrogen/argon mixture gas). The gas can be a mixture of particular gases (e.g., Ar:$H_2$::5-10%:85-90% by volume) that can remove oxygen and fluorine atoms from the ordered oxyfluoride compound. Without wishing to be bound by theory, it is believed that the hydrogen gas reduces the self-activating phosphor to remove oxygen and fluorine atoms. Thus, the by-product gas may include water and HF gases.

Reducing the ordered oxyfluoride material can be performed at elevated temperatures to control the amount of defects created, to facilitate the reduction reactions, and to ensure that any by-product gas formed by the reaction is removed from the resulting self-activating phosphors. The temperature of this reaction with the hydrogen, argon argon/hydrogen mixture gas can be utilized to control the amount of defects present in the oxygen and fluorine sublattice. Generally, the temperature of the gas will be from about 200° C. to about 1000° C., such as from about 500° C. to about 1000° C. and from about 800° C. to about 1000° C.

The time compound is exposed to the hydrogen or argon/hydrogen mixture gas can be utilized to control the amount of defects present in the oxygen and fluorine sublattice. Generally, using a hotter hydrogen gas requires less exposure time to achieve similar defect levels, and conversely, using a lower temperature of gas requires more exposure time to achieve similar defect levels. The flow of gas can also be regulated to control the amount of defects introduced into the ordered oxyfluoride material.

The defects occur in the oxygen and fluorine sublattice of the crystalline structure introduce another variable (y) into the formula, producing the formula:

$$Sr_{3-v}A_vMO_{4-x}F_{1-y}$$

where A is Ca, Ba, or a mixture thereof; M is Al, Ga, In, W, Mo, or a mixture thereof; $0 \leq v \leq 1$; $0 < x < 0.4$; and $0 < y < 0.2$. The amount of defects in the oxygen and fluorine sublattice can be controlled as desired. In one particular embodiment, the defects in the oxygen and fluorine sublattice can be such that $0.05 < y < 0.15$.

Altering the oxygen and fluorine sublattice of the ordered oxyfluoride compounds surprisingly creates a self-activating phosphor that can exhibit luminescence in the visual spectrum of light. In particular, the wavelength of luminescence of a particular self-activating phosphor of the present invention can be controlled by altering the amount of defects in the oxygen and fluorine sublattice (i.e., controlling "y" in the general formula given above). Without wishing to be bound by theory, it is believed that the defects created in this process are located in the $A_2F^{3+}$ and $AMO_4^{3-}$ layers, respectfully for the fluorine and oxygen defects.

This luminescence can be achieved without the introduction of or doping with rare earth elements. The exclusion of the rare earth elements can provide a significant cost savings in the manufacture of the self-activating phosphors of the present invention. Thus, in one particular embodiment, the self-activating phosphors can be substantially free of rare earth elements (e.g., less than 0.1% by weight to completely free of rare earth elements) in its crystalline structure. As used herein, the term "rare earth elements" refers to the chemical elements including the lanthanoids (the 15 elements from lanthanum to lutetium, atomic numbers 57-71) and, because of chemical similarities to the lanthanoids, the elements scandium (atomic number 21) and yttrium (atomic number 39) of group IIIb. The 17 rare-earth elements are: scandium (Sc), yttrium (Y), lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), and lutetium (Lu).

Achieving luminescence without any doping of activators into the host lattice is advantageous and can represent an enormous cost-saving factor for lamp manufacturers. Additionally, the self-activating phosphors could also be a very good value proposition for 'backlights' in Liquid Crystal Display (LCD) panels. These backlights are fluorescent tubes containing a low-mercury vapor to create as one excitation 254 nm UV light. The inside of this backlight is coated with a 'white light' phosphor where the CRI is not as important as in lighting.

In some embodiments, the self-activating phosphors of the present disclosure may be combined with an activator ion to form a phosphor. Suitable activator ions can include but are not limited to La, Ac, Ce, Pr, Nd, Sm, Eu, Gd, Tb, Dy, Ho, Er, Tm, Yb, Th, U, Cr, Mn, Tc, Re, Cu, Ag, Au, Zn, Cd, Hg, As, Sb, Bi, Ge, Sn, Pb, In, Tl, and combinations and mixtures thereof. In particular embodiments, the activator ion can comprise an ion of Eu, and/or the activator ion can comprise an ion of Ce. A compound coupled with an activator ion can be represented by either of the formulas:

$$Sr_{3-v}A_vMO_{4-x}F_{1-y}:Q^{n+} \text{ or } Q^{n+}{:}Sr_{3-v}A_vMO_{4-x-t}F_{1-y}$$

where A is Ca, Ba, or a mixture thereof; M is Al, Ga, In, W, Mo, or a mixture thereof; $0 \leq v \leq 1$; $0 < x < 0.4$; $0 < y < 0.2$; $Q^{n+}$ is at least one activator ion (such as those described above) having a positive charge (e.g., $1 \leq n \leq 4$); and $0 < t < 0.15$.

The self-activating phosphors can be configured to absorb, with high efficiency ultraviolet (UV) light (e.g., 254 nm) emitted by a light source, such as an LED or laser diode, and emit light of a wavelength longer than that of the absorbed light. Thus, in one embodiment, the self-activating phosphors can absorb UV light and emit visible light. The self-activating phosphors can be configured to emit broad color spectra that can be tuned from blue to green to yellow and red emissions.

C. Nitrogen Substituted for Oxygen

Another embodiment of the self-activating phosphor can include nitrogen atoms substituted for a portion of the oxygen atoms in the compound. This substitution of nitrogen atoms for oxygen atoms in the self-activating phosphor can alter and control the wavelength of luminescence. For example, the nitrogen containing compounds can have the general formula:

$$Sr_{3-v}A_vMO_{4-x-z}F_{1-y}N_z$$

where A is Ca, Ba, or a mixture thereof; M is Al, Ga, In, W, Mo, or a mixture thereof; $0 \leq v \leq 1$; $0 < x < 0.4$; $0 < y < 0.2$; and $0 < z < 0.1$. In particular embodiments, M can comprise In; M can comprise Al; and/or M can comprise Ga. For example, M can comprise a mixture of at least two of Al, Ga, In, W, and Mo. In one embodiment, M can comprise a mixture of at least three of Al, Ga, In, W, and Mo. In one particular embodiment, v can be 0 and M can be Al, with the composition further comprising an activator ion coupled with the compound. In another particular embodiment, A can be Ba, M can be Al, and $0 < v < 1$, with the composition further comprising an activator ion coupled with the compound.

Nitrogen can be introduced into the structure by annealing the structured compound with ammonia. When desirable, ammonia ($NH_3$) can be added to the gas mixture to anneal the ordered oxyfluoride material and incorporate nitrogen into the structure. The result of this annealing is the substitution of a portion of the oxygen atoms in the ordered oxyfluoride material with nitrogen atoms, as discussed above.

In another embodiment, the indium containing ordered oxyfluorine compound can contain nitrogen, according to the formula:

$$Sr_{3-v}A_vIn_{1-m}M_mO_{4-x-z}FN_z$$

where A is Ca, Ba, or a mixture thereof; M is Al, Ga, W, Mo, or a mixture thereof; $0 \leq v \leq 1$; $0 \leq m < 1$; $0 < x < 4$; and $0 < z < 0.1$.

D. Light Emitting Devices

The presently disclosed self-activating phosphors can be included in light emitting devices, such as fluorescent bulbs and tubes, light emitting diodes (LEDs), liquid crystal display (LCD) panels, etc. The self-activating phosphors of the present disclosure can be utilized in the same manner as other known phosphors in these devices.

In one particular embodiment, the light emitting device can include a discharge lamp (e.g., a Hg plasma lamp) that generates UV light at about 254 nm to excite the composition, such that the composition produces an emission in the visible light spectrum (e.g., wavelengths from about 380 to about 750 nm).

EXAMPLES

Figure 4:
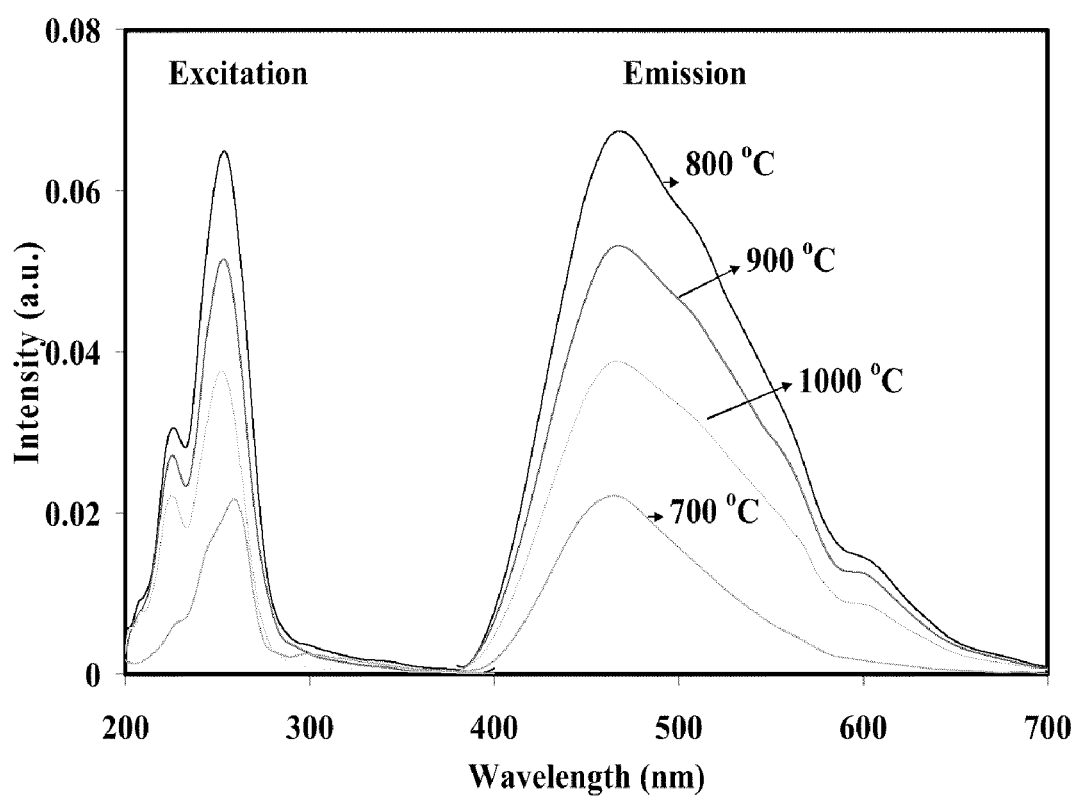
FIG. 4 shows the dependence of visible light emission as a function of temperature conditions of exposure to $H_2/Ar$ gas upon excitation under 254 nm.

On particular example of this compound can be represented by the formula: $Sr_3AlO_{4-x}F$, which can be made to emit light in the green wavelengths (CIE coordinates 0.2334, 0.5502) and, by tailoring the defect structure of the $Sr_3AlO_{4-x}F_{1-y}$, can be moved to the blueish-white part of the CIE diagram when exposed to 254 nm UV light (CIE coordinates 0.2429, 0.3387). The defects were created by exposure to an $H_2/Ar$ (5%/95%) gas mixture at a controlled temperature. FIG. 4 shows the dependence of visible light emission as a function of temperature conditions (i.e., at 700° C., 800° C., 900° C., and 1000° C.) of exposure to $H_2/Ar$ gas upon excitation under 254 nm.

The material $Sr_3AlO_{4-x}F_{1-y}$ has an approximate CCT near 10,000K—the upper limit of what an analog TV screen has. Due to its low-cost starting reagents and simple manufacturing conditions it is believed that members of this material (with different values of x and y) will be useful in this and other applications where 'white light' is required.

As the excitation/emission data reveal the $Sr_3AlO_{4-x}F_{1-y}$ materials have a 200 nm broad emission band centered at about 500 nm when excited with 254 nm. The high color temperature is due to its location in the blue region of the CIE diagram. By adding appropriate amounts of Europium (Eu) as an activator to the $Sr_3AlO_{4-x}F_{1-y}$ material the CIE values will shift more towards the white light and lower the color temperature.

This makes materials of the $Eu:Sr_3AlO_{4-x}F_{1-y}$ family interesting 'white light' phosphors for higher value applications such as compact fluorescent lights. The present invention claims all activator-doped members of the general family of $Sr_3AlO_{4-x}F_{1-y}$ as new compositions of matter with applications as down-conversion phosphors.

Table 1 shows a comparison of $Sr_3AlO_{4-x}F_{1-y}$ to other known broad band phosphors.

| Phosphor | Emission Peak | 50% Bandwidth |
|---|---|---|
| $Sr_3AlO_{4-x}F_{1-y}$ | 495 nm | 110 nm |
| $MgWO_4$ | 473 nm | 118 nm |
| $CaWO_4$: Pb | 433 nm | 111 nm |
| $Ca_5F(PO_4)_3$: Sb | 482 nm | 117 nm |
| $Sr_5F(PO_4)_3$: Sb: Mn | 509 nm | 127 nm |
| $(Ca,Zn,Mg)_3(PO_4)_2$: Sn | 610 nm | 146 nm |
| $(Sr,Mg)_3(PO_4)_2$: Sn | 626 nm | 120 nm |
| $BaMgAl_{10}O_{17}$: Eu: Mn | 456, 514 nm | 50 nm |
| $Zn_2SiO_4$: Mn | 528 nm | 40 nm |

These and other modifications and variations to the present invention may be practiced by those of ordinary skill in the art, without departing from the spirit and scope of the present invention, which is more particularly set forth in the appended claims. In addition, it should be understood the aspects of the various embodiments may be interchanged both in whole or in part. Furthermore, those of ordinary skill in the art will appreciate that the foregoing description is by way of example only, and is not intended to limit the invention so further described in the appended claims.

What is claimed:

1. A composition comprising a compound having the formula:

$$Sr_{3-v}A_vMO_{4-x}F_{1-y}$$

wherein
A is Ca, Ba, or a mixture thereof;
M is Al, Ga, In, W, Mo, or a mixture thereof;
$0 \leq v \leq 1$;
$0 < x < 0.4$; and
$0 < y < 0.2$.

2. The composition as in claim 1 further comprising nitrogen such that the compound has the formula:

$$Sr_{3-v}A_vMO_{4-x-z}F_{1-y}N_z$$

wherein $0 < z < 0.1$.

3. The composition as in claim 1, wherein M comprises In.
4. The composition as in claim 1, wherein M comprises Al.
5. The composition as in claim 1, wherein M comprises Ga.
6. The composition as in claim 1, wherein M comprises a mixture of at least two of Al, Ga, In, W, and Mo.
7. The composition as in claim 1 a mixture of at least two of Al, Ga, In, W, and Mo.
8. The composition as in claim 1, wherein A comprises Ca.
9. The composition as in claim 8, wherein M comprises Al.
10. The composition as in claim 1, wherein the compound is substantially free of a rare earth element.
11. The composition as in claim 1, further comprising an activator ion coupled with the compound.
12. The composition as in claim 11, wherein the activator ion comprises an ion of an element selected from the group consisting of La, Ac, Ce, Pr, Nd, Sm, Eu, Gd, Tb, Dy, Ho, Er, Tm, Yb, Th, U, Cr, Mn, Tc, Re, Cu, Ag, Au, Zn, Cd, Hg, As, Sb, Bi, Ge, Sn, Pb, In, Tl, and mixtures thereof.
13. The composition as in claim 11, wherein the activator ion comprises an ion of Eu.
14. The composition as in claim 1, wherein $0.05 < y < 0.15$.
15. The composition as in claim 1, wherein v is 0 and M is Al, the composition further comprising an activator ion coupled with the compound.
16. The composition as in claim 15, wherein the activator ion comprises Ce.
17. The composition as in claim 1, wherein A is Ba, M is Al, and $0 < v < 1$, the composition further comprising an activator ion coupled with the compound.

18. The composition as in claim 17, wherein the activator ion comprises Ce.

19. A light emitting device comprising the composition of claim 1.

20. The light emitting device of claim 19 further comprising a discharge lamp generating ultraviolet light at about 254 nm to excite the composition such that the composition exhibits an emission at a wavelength of from about 380 to about 750 nm.

21. A method of doping a compound, the method comprising:
providing a compound having the formula:

$$Sr_{3-v}A_vMO_{4-x}F$$

wherein A is Ca, Ba, or a mixture thereof; M is Al, Ga, In, W, Mo, or a mixture thereof; $0<v<1$; and $0<x<4$; and
introducing defects into the compound by removing a portion of oxygen and fluorine atoms from the compound.

22. The method as in claim 21, wherein defects are introduced into the compound by introducing hydrogen gas to the compound.

23. The method as in claim 22, wherein the hydrogen gas is introduced to the compound at a temperature of from about 200° C. to about 1000° C.

24. A composition comprising a compound having the formula:

$$Sr_{3-v}A_vIn_{1-m}M_mO_{4-x}F$$

where A is Ca, Ba, or a mixture thereof; M is Al, Ga, W, Mo, or a mixture thereof; $0<m<1$; $0<v<1$; and $0<x<4$.

25. The composition as in claim 24 further comprising nitrogen such that the compound has the formula:

$$Sr_{3-v}A_vIn_{1-m}M_mO_{4-x-z}FN_z$$

where A is Ca, Ba, or a mixture thereof; M is Al, Ga, W, Mo, or a mixture thereof; $0<m<1$; $0<v<1$; $0<x<4$; and $0<z<0.1$.

* * * * *